United States Patent
Tsuruta et al.

(10) Patent No.: US 7,042,127 B2
(45) Date of Patent: May 9, 2006

(54) PERMANENT MAGNET EMBEDDED MOTOR

(75) Inventors: Toshifumi Tsuruta, Nagano (JP); Hideki Kanebako, Nagano (JP); Noboru Otsuki, Nagano (JP); Dongning Zhang, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 0 days.

(21) Appl. No.: 10/817,719

(22) Filed: Apr. 1, 2004

(65) Prior Publication Data

US 2004/0256940 A1 Dec. 23, 2004

(30) Foreign Application Priority Data

Apr. 2, 2003 (JP) ............................. 2003-099477
Jul. 17, 2003 (JP) ............................. 2003-198625

(51) Int. Cl.
*H02K 21/12* (2006.01)

(52) U.S. Cl. ............................. 310/156.53; 310/156.56

(58) Field of Classification Search ............................. 310/156.53–156.54, 156.56, 156.57, 156.58
See application file for complete search history.

(56) References Cited

U.S. PATENT DOCUMENTS

| 6,147,428 A | * | 11/2000 | Takezawa et al. ...... 310/156.57 |
| 6,208,054 B1 | * | 3/2001 | Tajima et al. ................. 310/46 |
| 6,525,442 B1 | * | 2/2003 | Koharagi et al. ...... 310/156.48 |

FOREIGN PATENT DOCUMENTS

| JP | 05-236684 | 9/1993 |
| JP | 05-236686 | 9/1993 |
| JP | 2000-069717 | 3/2000 |
| JP | 2000-350393 | 12/2000 |

* cited by examiner

Primary Examiner—Tran Nguyen
(74) Attorney, Agent, or Firm—Reed Smith LLP

(57) ABSTRACT

A permanent magnet embedded motor including a rotor which is provided with a plurality of slits and a plurality of permanent magnets embedded into the slits and a stator which is provided with an iron core having a plurality of slots to which a coil is wound and is arranged to face the rotor via a gap. The slit includes a permanent magnet embedded part into which the permanent magnet is embedded in a direction perpendicular to the radial direction of the rotor and an "L"-shaped air gap part integrally provided on both ends of the permanent magnet embedded part. An angle "θ1" for one pole of the rotor and an angle "θ2" of the "L"-shaped air gap part are set to be $0.1 \leq \theta 2/\theta 1 \leq 0.3$. Further, a radius "R" of a circumscribed circle of the rotor and a radius "R1" for forming an outer peripheral face of the rotor at a portion of the "L"-shaped air gap part are preferably set to be $0.1 \leq (R-R1)/R \leq 0.3$.

7 Claims, 10 Drawing Sheets

[Fig. 1]
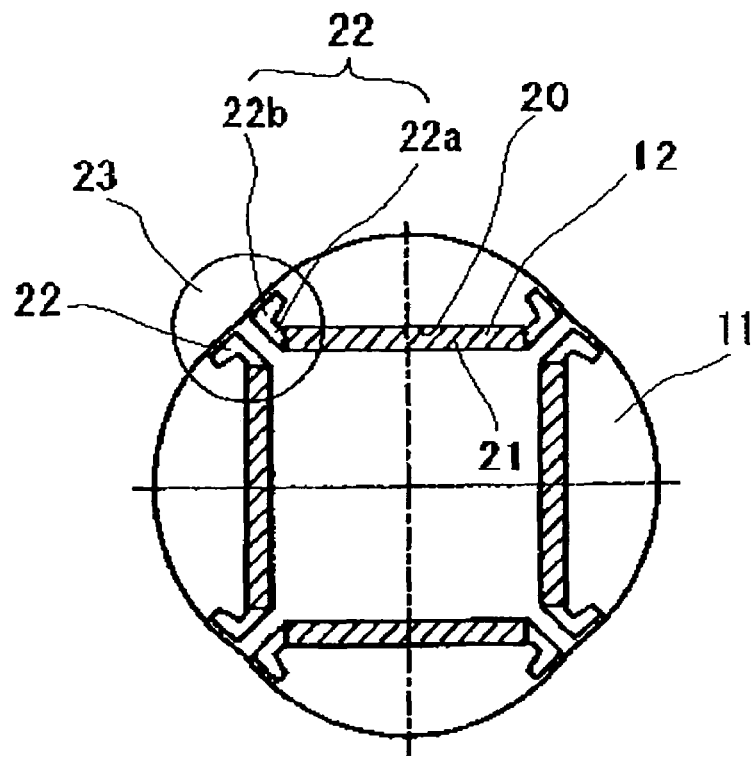
[Fig. 2]
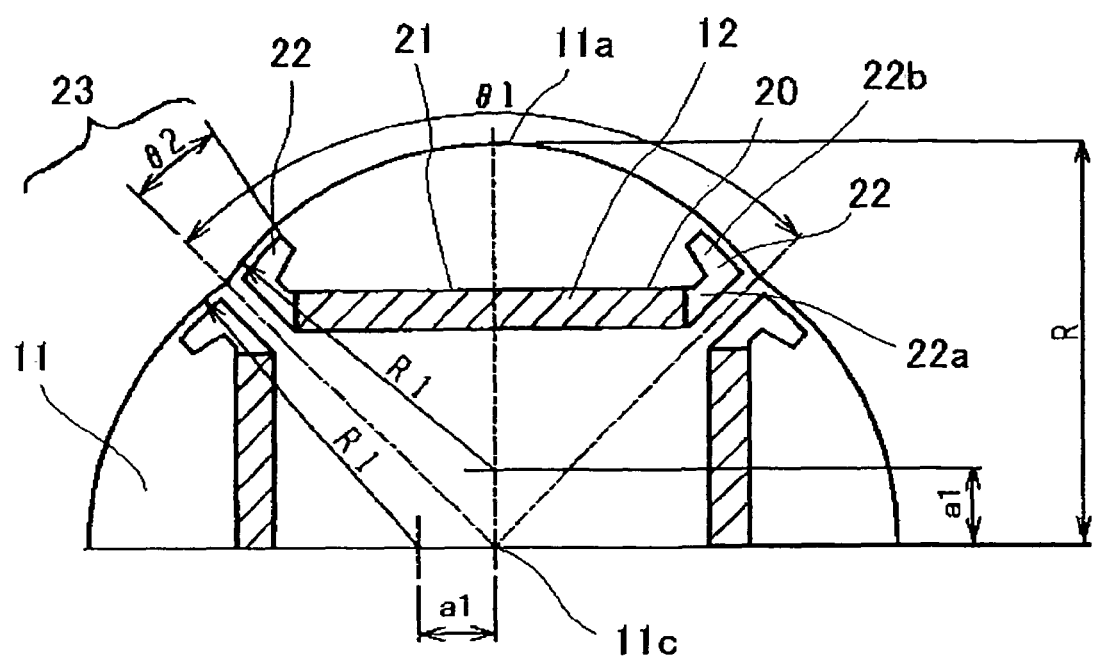

[Fig. 3]
(a)
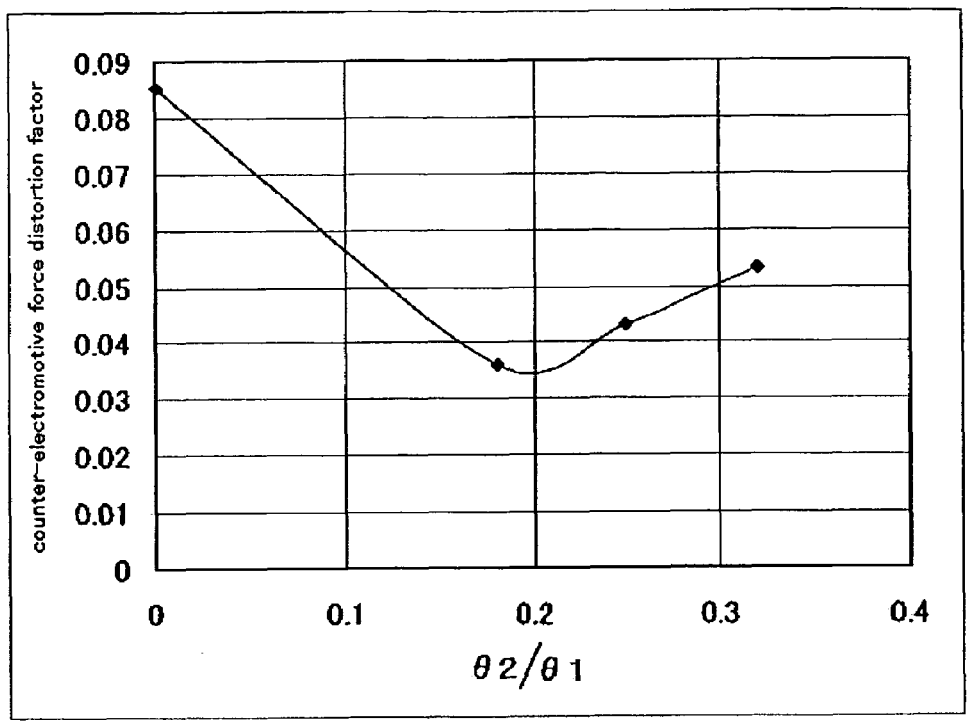
variation of counter-electromotive force distortion factor with respect to $\Theta 2/\Theta 1$
(b)
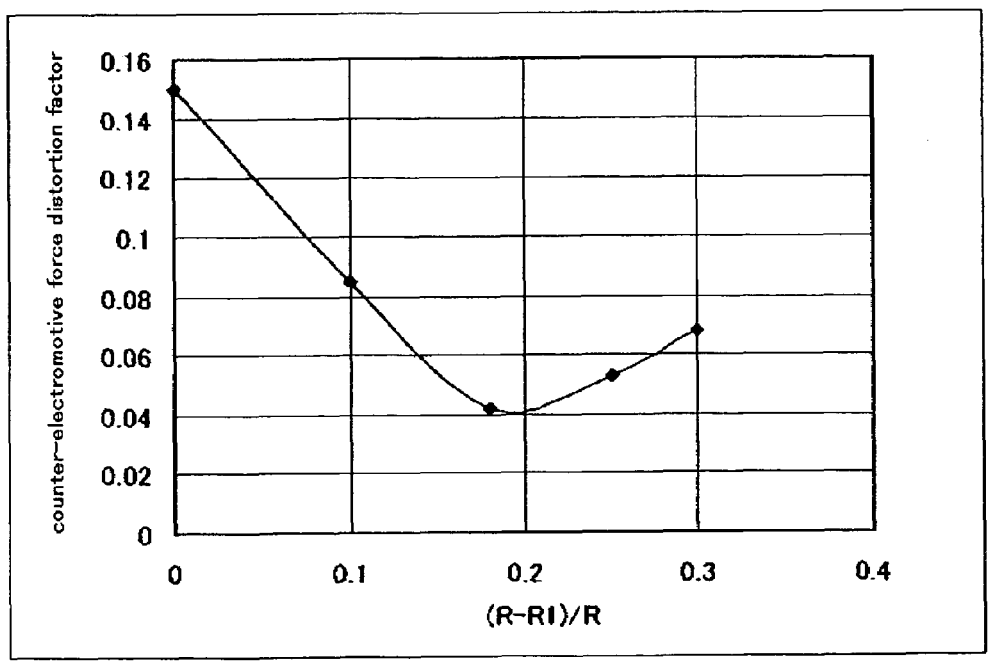
variation of counter – electromotive force distortion factor with respect to $(R-R1)/R$

[Fig. 4]
(a)
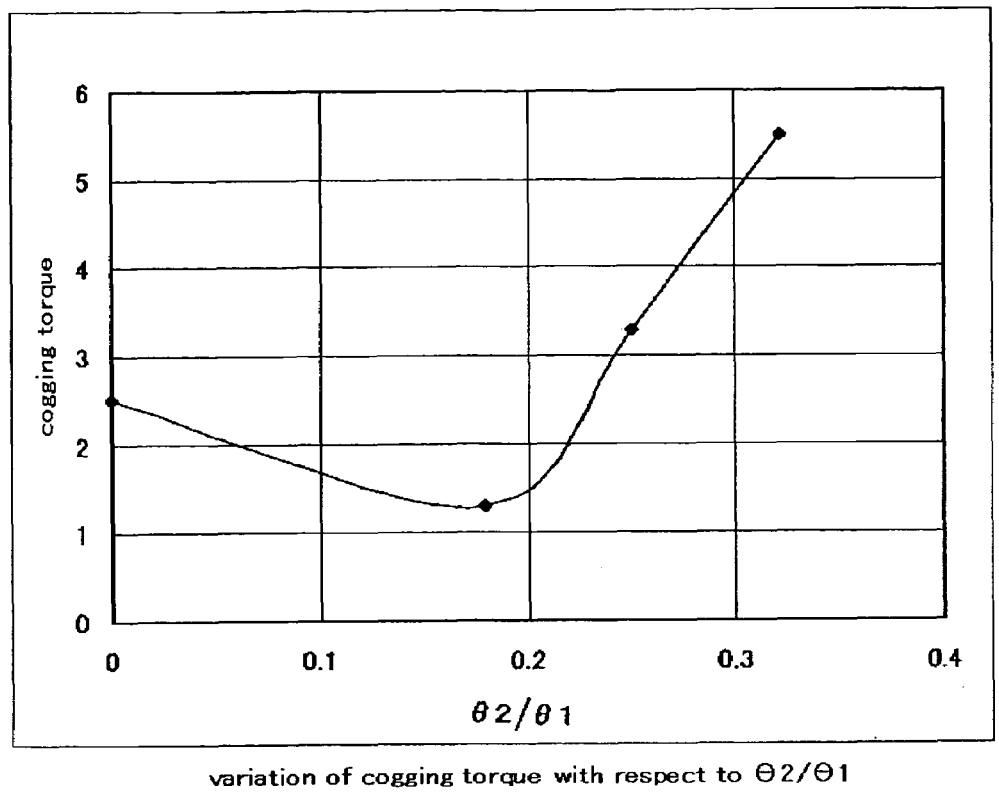
variation of cogging torque with respect to Θ2/Θ1
(b)
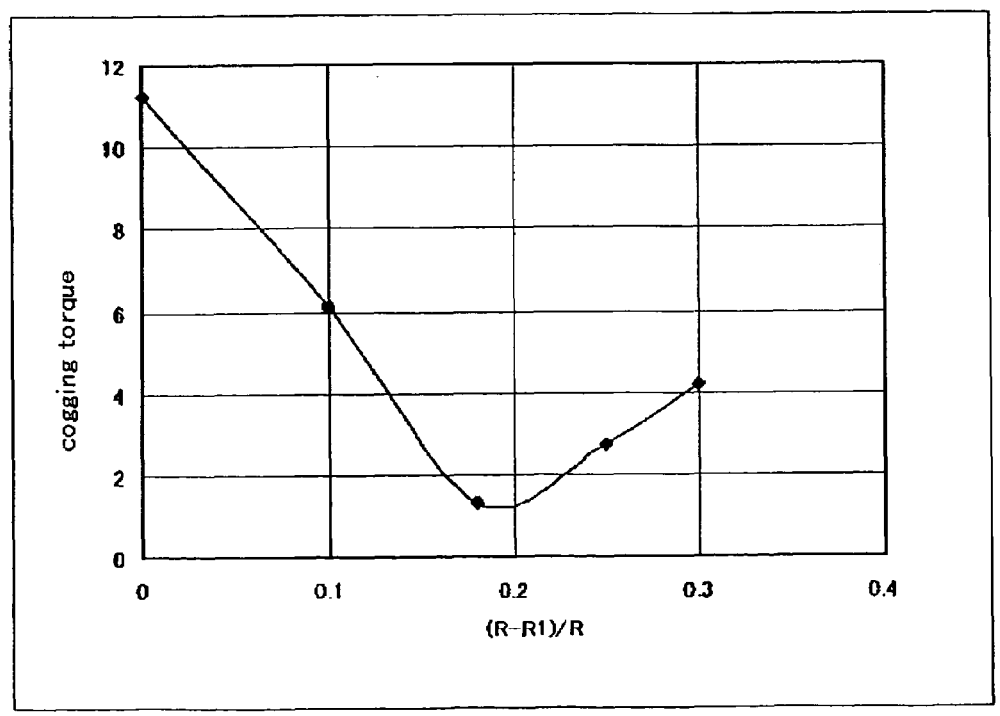
variation of cogging torque with respect to (R-R1)/R

[Fig. 5]
(a)
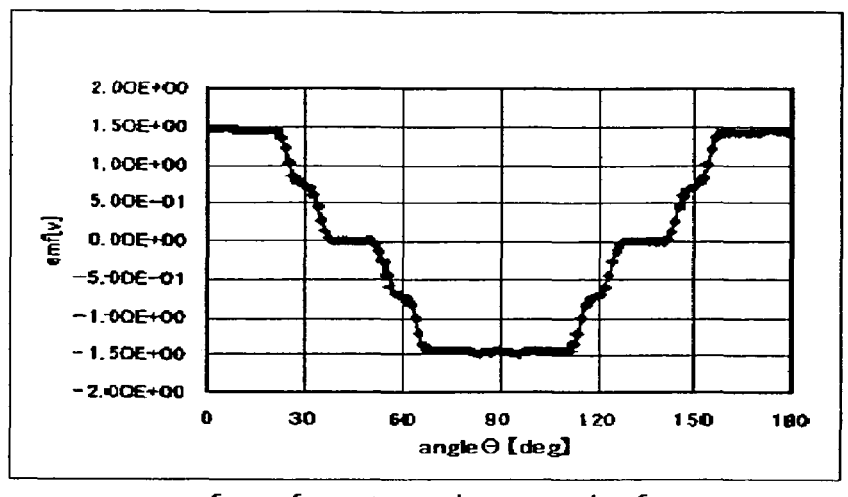
wavefrom of counter - electoromotive force
(b)
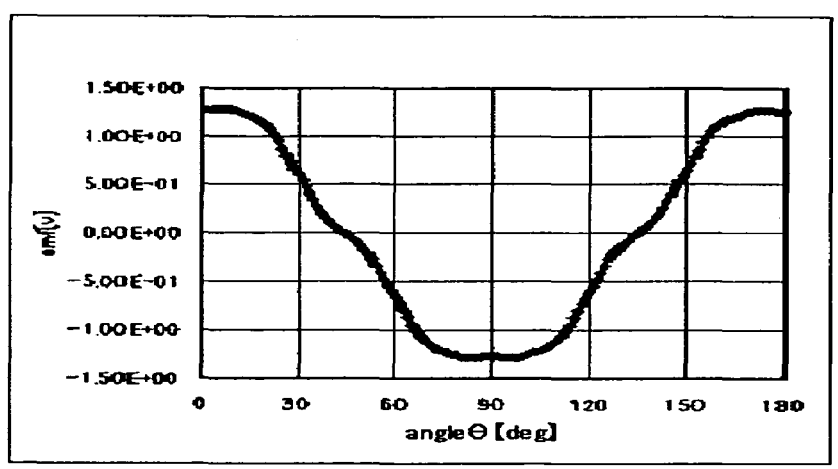
wavefrom of counter - electoromotive force
(c)
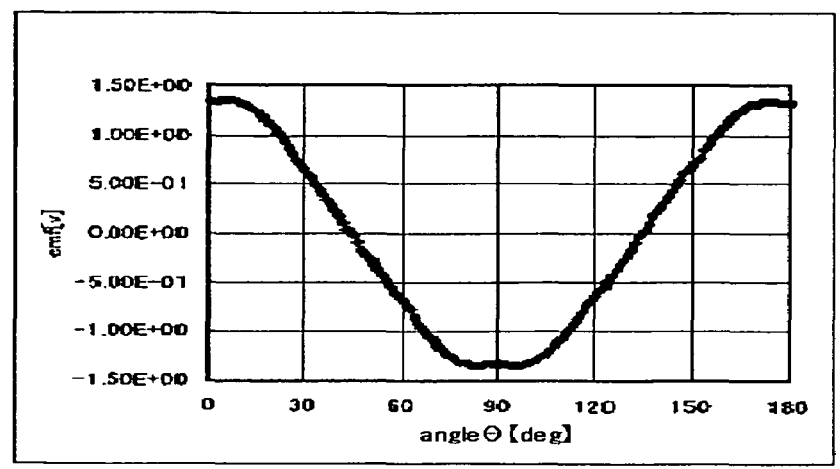
wavefrom of counter - electoromotive force

[Fig. 6]
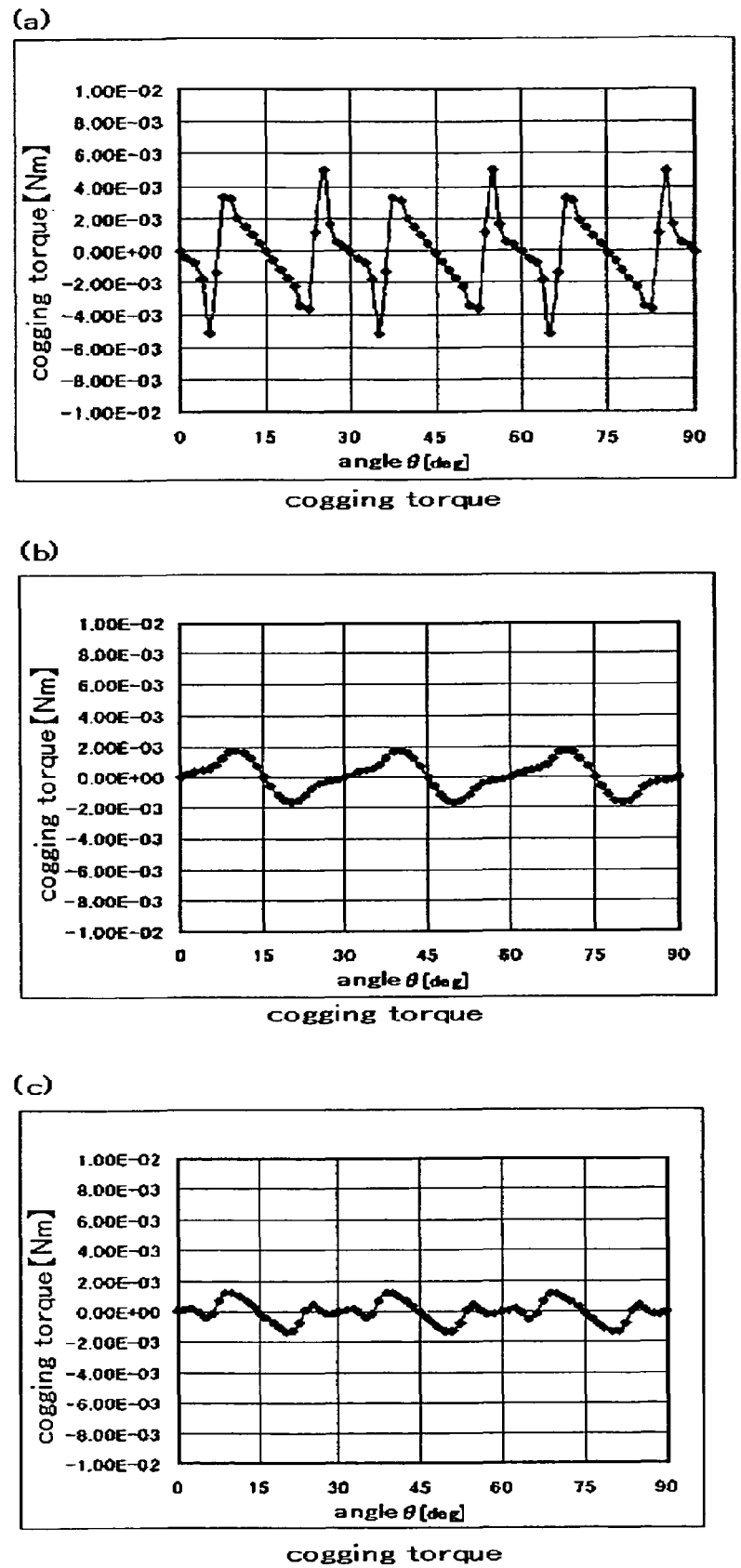

[Fig. 7]
(a)
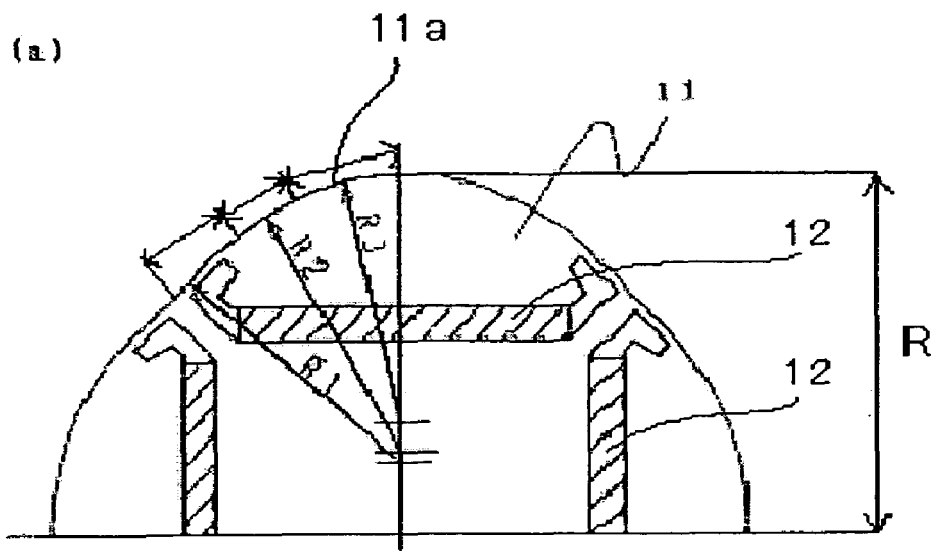
(b)
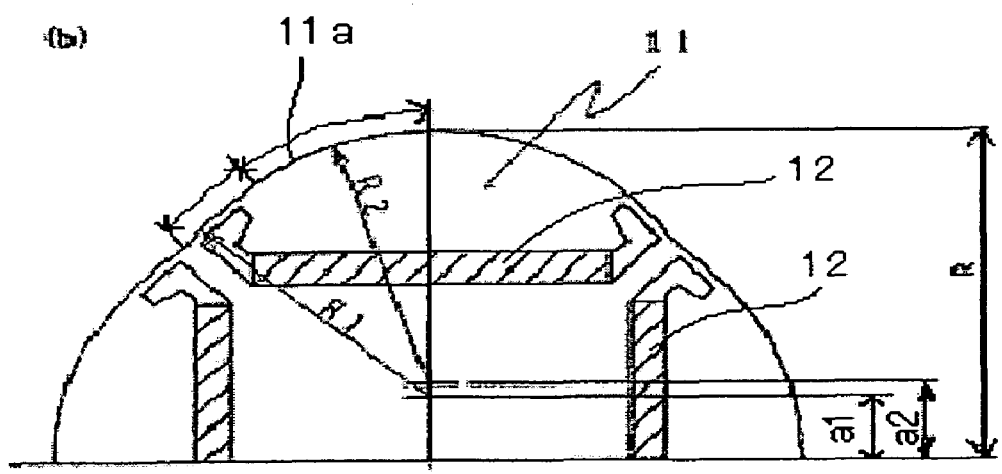

[Fig. 8]
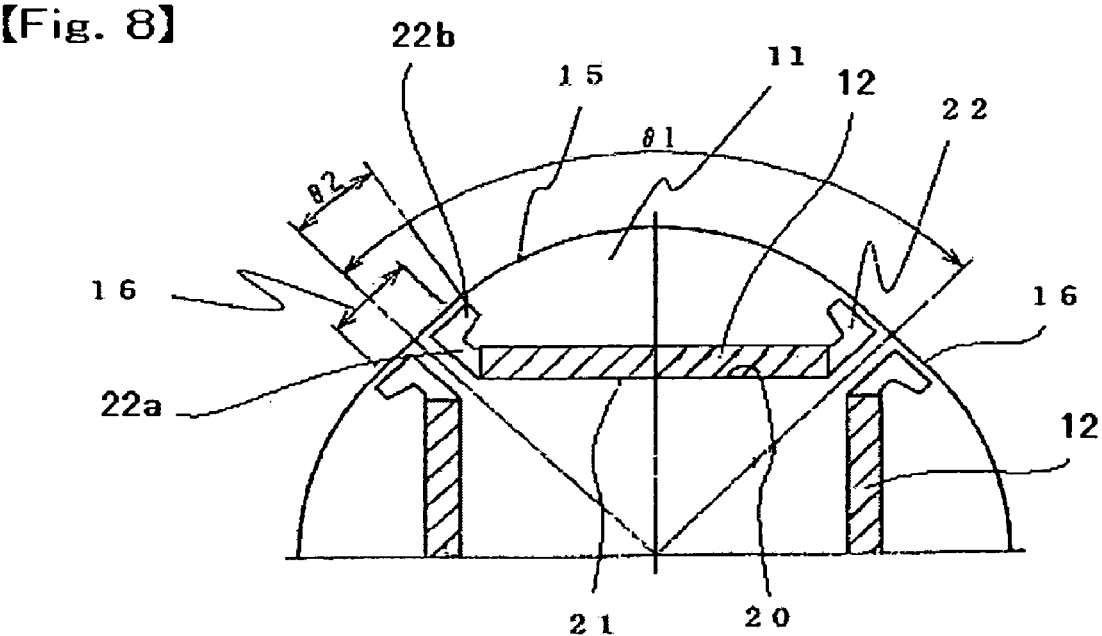
[Fig. 9]
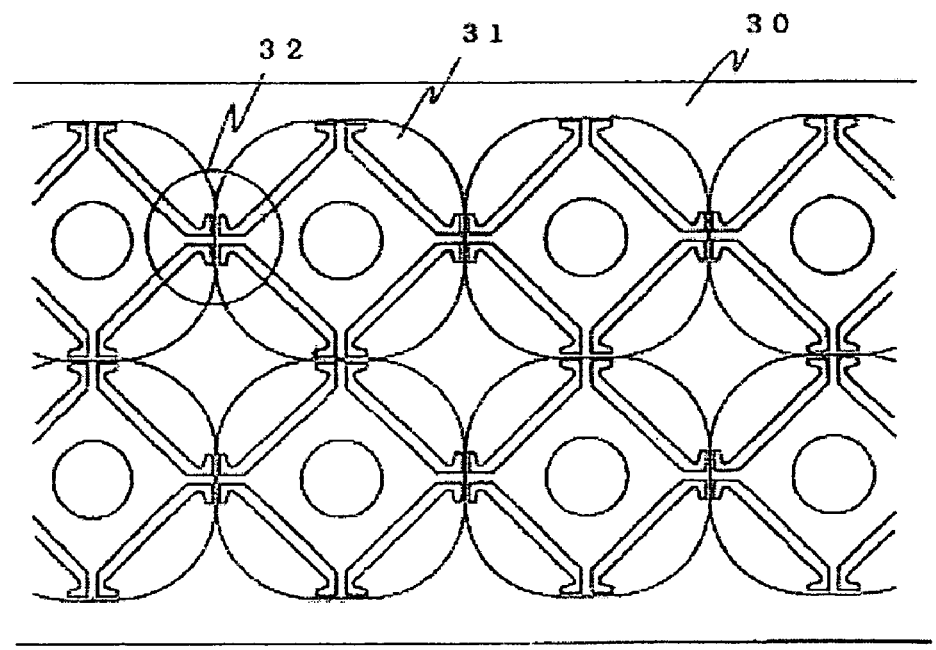

[Fig. 10]
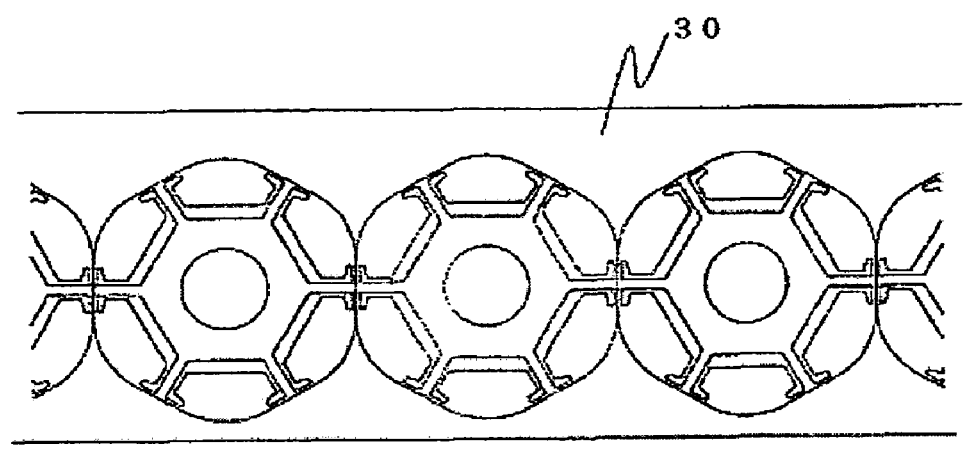
[Fig. 11]
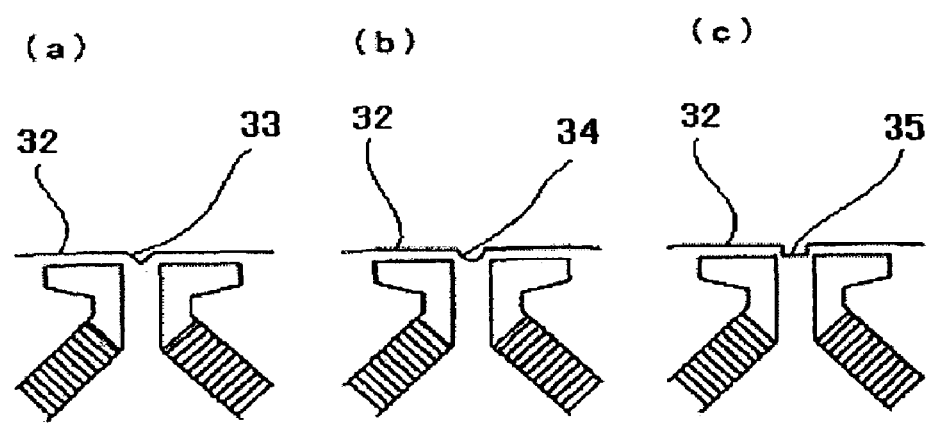

[Fig. 12]
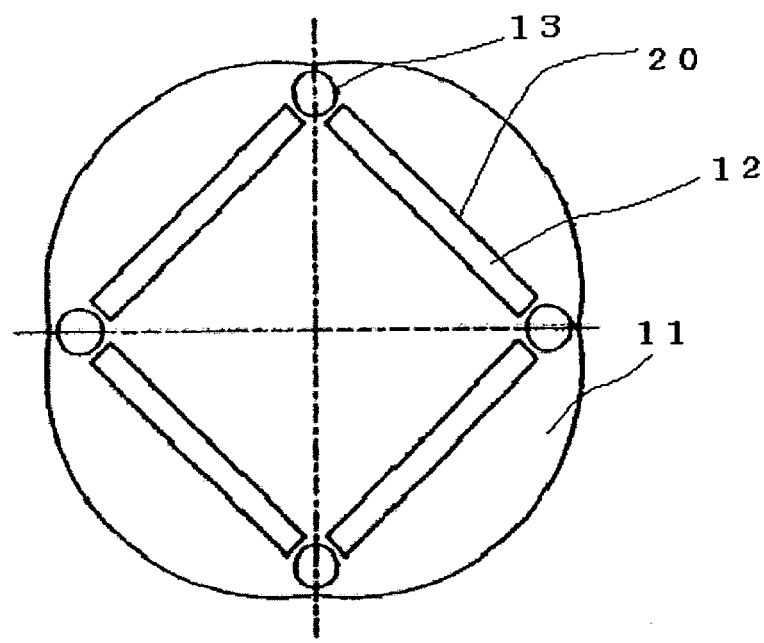
[Fig. 13]
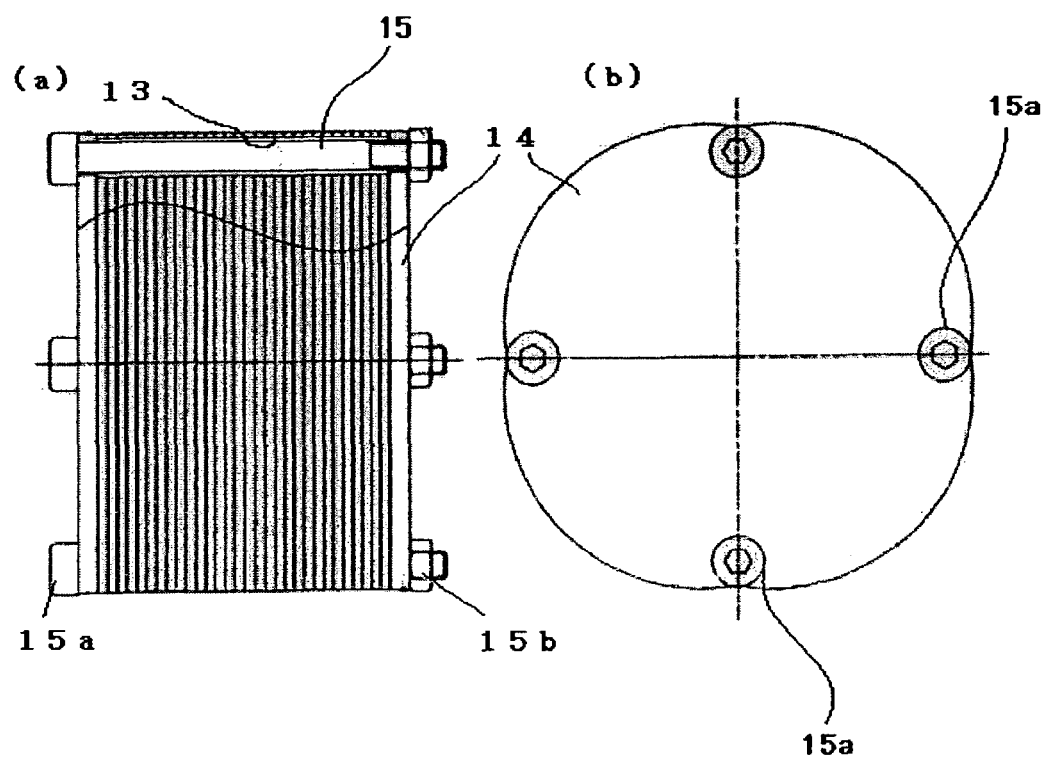

[Fig. 14]
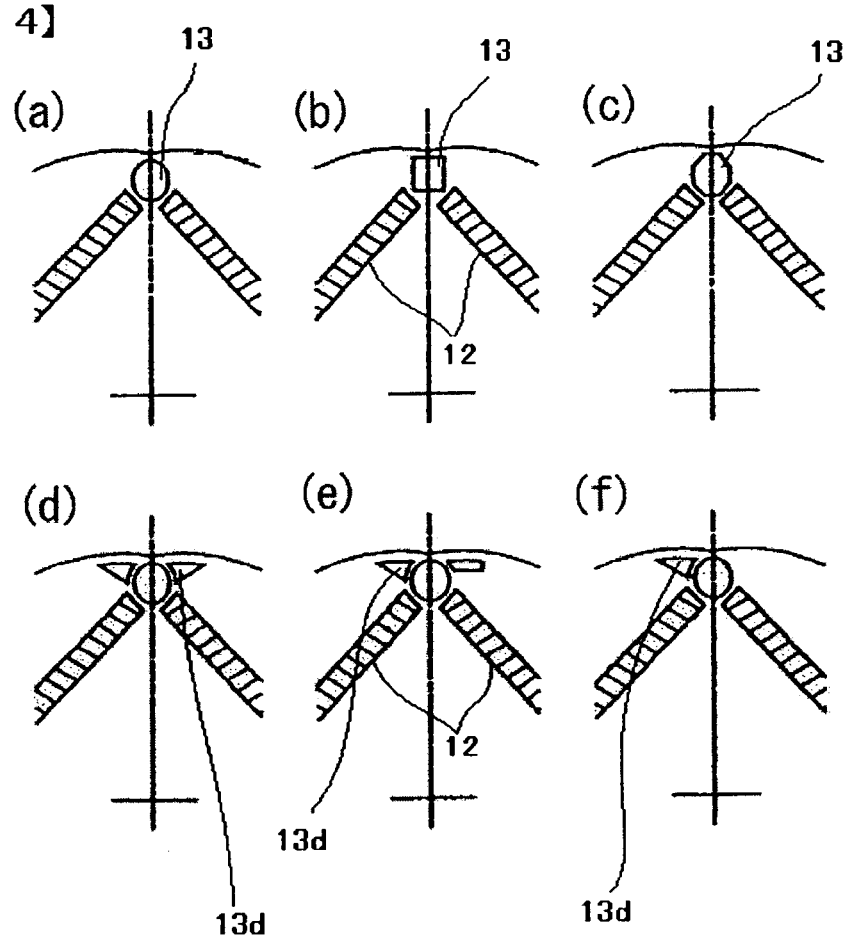
[Fig. 15]
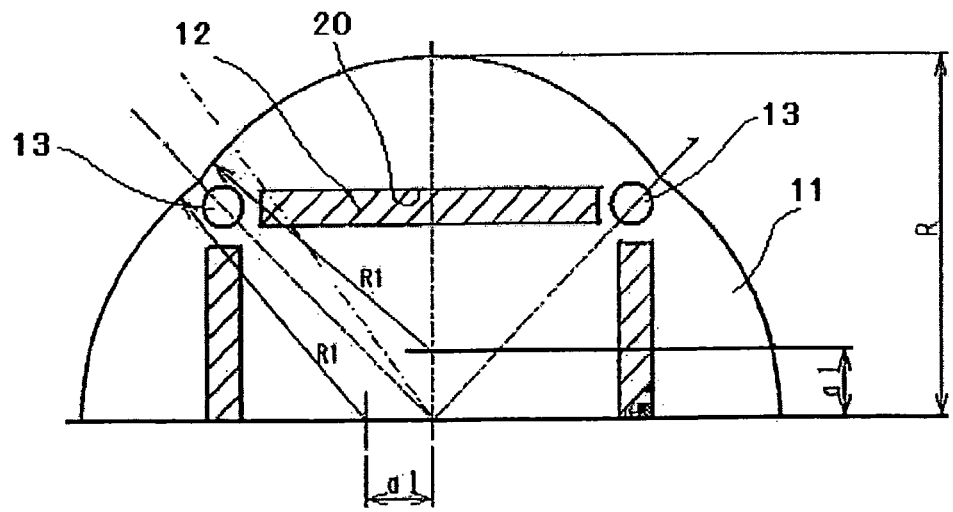

PERMANENT MAGNET EMBEDDED MOTOR

CROSS REFERENCE TO RELATED APPLICATIONS

This application claims priority to Japanese Application No. 2003-099477 filed Apr. 2, 2003 and priority to Japanese Application No. 2003-198625 filed Jul. 17, 2003, which are incorporated herein by reference.

BACKGROUND OF THE INVENTION

1. Field of the Invention

The present invention relates to a permanent magnet embedded motor in which a rotor provided with a plurality of slits into which permanent magnets are respectively embedded is disposed via a gap to face a stator having an iron core provided with a plurality of slots to which coils are wound.

2. Description of Related Art

A permanent magnet embedded motor is often used in an application required to rotate a rotor at a high speed. In a motor having such a constitution in which permanent magnets are embedded into a rotator, at least a pair of permanent magnets is disposed at symmetrical positions. The constitution generally used is that two pairs of permanent magnets are embedded such that their magnetic poles are positioned so as to be alternately different from each other in a peripheral direction.

In the motor having a constitution in which two pairs of permanent magnets are embedded, when the distance between the adjacent permanent magnets embedded is small, the magnetic disturbance occurs in the flow of magnetic flux inside the rotor due to the short circuit of the magnetic flux between the adjacent magnetic poles or the like. Therefore, the magnetic force generated by the mutual action with the stator attenuates and the enough torque which is required to rotate the motor is not obtained. Accordingly, the cogging torque occurs and causes to decrease the rotation efficiency of the motor.

In order to solve the problems, some prior attempts have been proposed. For example, one such prior attempt is that the center of the outer diameter of a permanent magnet embedded in a rotor is eccentric to that of the rotor so that the outer diameter of the outside contour of the permanent magnet is smaller than the outer diameter passing through apexes of the adjacent permanent magnets to make the thickness of the adjoining portion of the permanent magnet thinner. Therefore, the configuration of the rotor is formed in a petal shape and thus the short circuit of the magnetic flux is reduced and a smooth rotation without torque irregularity can be attained (for example, refer to Japanese Patent Laid-Open No. 2000-350393).

Another example is that gap portions are formed on both sides of the slit of a rotor to which a permanent magnet is embedded to magnetically insulate the adjacent magnetic poles from each other and thereby the short circuit of the magnetic flux and the attenuation of the magnetic force which is the source of a torque are prevented (for example, refer to Japanese Patent Laid-Open No. Hei 05-236684 and Japanese Patent Laid-Open No. 2000-069717).

In addition, in the motor having a constitution in which a permanent magnet is embedded in a rotor as described above, a hole is formed at a position where the flux change in a rotor core is little and a pin or a bolt is provided so as to pass through the hole to integrate laminated rotor cores together firmly. Thereby, the disturbance of the magnetic flux in the rotor core is reduced and the rotation efficiency of the motor can be enhanced (for example, refer to Japanese Patent Laid-Open No. Hei 05-236686).

In the above-mentioned conventional permanent magnet-embedded motors, the cogging torque and the counter-electromotive force distortion factor are reduced to some extent. However, the configuration of the rotor near the place where the polarity of the magnetic flux distribution is inverted is required to improve in order to reduce the torque ripple, noise or vibration.

Especially, the air gap portion provided at a prescribed position in the rotor for preventing the short circuit between the adjacent permanent magnets may be effective for preventing the attenuation of the torque required for rotation and for decreasing the torque irregularity. However, the shape and the size of the air gap portion provided in the rotor are the important elements which have influence on the size of the entire motor and thus it is important to obtain its optimal configuration and size. When the air gap portion is simply made larger, a useless portion is formed in the motor. On the contrary, the gap portion is simply formed to be smaller, the effects for preventing the short circuit of the magnetic flux and for decreasing the torque irregularity may not be expected. Therefore, it is important that the configuration of the rotor or the configuration of the air gap portion provided in the rotor is formed to be optimal.

In addition, the rotor is constituted by laminating a plurality of rotor plates in the manufacturing process. The rotor plate is, for example, formed by punching out from a silicon steel plate with a press machine or the like. In order to form the configuration of the rotor in the petal shape, the rotor plate is required to be formed in a petal shape However, the rotor plate is formed in such a manner that a plurality of rotor plates are successively punched out from a sheet of silicon steel plate. Therefore, in the case that the contour of the rotor plate is formed in a petal shape, it is difficult to perform punching without being provided with a space between the adjacent rotor plates to be formed from the sheet of silicon steel plate. For example, even when the adjacent rotor plates are punched out in the state that they are disposed without a gap space therebetween in the silicon steel plate, two rotor plates can come into contact with only one point and the other portions are separated from each other, which causes to form a useless space. Therefore, the steel plate material of the portion corresponding to the useless space is not used as the rotor plate and thus the sufficient utilization of material cannot be attained.

Furthermore, in the conventional permanent magnet-embedded motor, even when the hole is formed at the position apart from the flux change, in the case that the fixing member such as a pin or a bolt which integrates the laminated iron cores is made by magnetic substance, the iron loss (hysteresis loss and eddy current loss) may occur, which causes to lower the rotation efficiency. Besides, when the configuration of the rotor near the place where the polarity of the magnetic flux distribution is inverted is not improved and the outer peripheral configuration of the rotor is not improved, the cogging torque and the counter-electromotive force distortion factor remain larger and thus it is insufficient to reduce noise and vibration.

OBJECTS AND SUMMARY OF THE INVENTION

In view of the problems described above, it is an object of the present invention to provide a permanent magnet-embedded motor capable of reducing the torque ripple, vibration and noise.

Also, it is another object of the present invention to provide a permanent magnet-embedded motor capable of reducing the quantity of waste of material for the rotor in a manufacturing process of the rotor.

Also, it is another object of the present invention to provide a permanent magnet-embedded motor capable of preventing the occurrence of the iron loss and enhancing the rotation efficiency.

In order to achieve the above objects, according to the present invention, there is provided a permanent magnet embedded motor including a rotor which is provided with a plurality of slits and a plurality of permanent magnets embedded into the slits and a stator which is provided with an iron core having a plurality of slots to which a coil is wound and is arranged to face the rotor via a gap. The slit includes a permanent magnet embedded part into which the permanent magnet is embedded in a direction perpendicular to the radial direction of the rotor and an "L"-shaped air gap part integrally provided on both ends of the permanent magnet embedded part. An angle "$\theta 1$" for one pole of the rotor and an angle "$\theta 2$" of the "L"-shaped air gap part are set to be $0.1 \leq \theta 2/\theta 1 \leq 0.3$. The ratio of $\theta 2/\theta 1$ is preferably set to be $0.15 \leq \theta 2/\theta 1 \leq 0.25$, and more preferably set to be roughly 0.2.

According to the constitution described above, the length of the "L"-shaped air gap part in the peripheral direction of the rotor is set to be appropriate, and thus the short circuit of the magnetic fluxes between the adjacent permanent magnets is prevented and the attenuation of the rotation torque at the inverting portion of the magnetic pole is prevented.

In accordance with an embodiment of the present invention, the angle "$\theta 1$" for one pole of the rotor and the angle "$\theta 2$" of the "L"-shaped air gap part are set to be $0.1 \leq \theta 2/\theta 1 \leq 0.3$ and the radius "R" of a circumscribed circle of the rotor and the radius "R1" for forming an outer peripheral face of the rotor at a portion of the "L"-shaped air gap part are set to be $0.1 \leq (R-R1)/R \leq 0.3$. Concretely, the radius of the outer peripheral face of the rotor over the angle "$\theta 1$" is preferably set to be "R1". The ratio of $(R-R1)/R$ is preferably set to be $0.15 \leq (R-R1)/R \leq 0.25$, and more preferably set to be roughly 0.2.

According to the constitution described above, the length of the "L"-shaped air gap part in the peripheral direction of the rotor is set to be appropriate, and thus the short circuit of the magnetic fluxes between the adjacent permanent magnets is prevented and the attenuation of the rotation torque at the inverting portion of the magnetic pole is prevented.

In order to achieve the above advantage, according to the present invention, there is provided a permanent magnet embedded motor including a rotor which is provided with a plurality of slits and a plurality of permanent magnets embedded into the slits, a stator which is provided with an iron core having a plurality of slots to which a coil is wound and is arranged to face the rotor via a gap, and a substantially straight part which forms a part of an outer peripheral face of the rotor. Therefore, adjacent rotor plates constituting the rotor are capable of being disposed without a gap space therebetween in a steel plate which is material for the rotor and thus the waste of the material is reduced when the steel plate is punched out by a press machine or the like.

In accordance with an embodiment of the present invention, the slit include a permanent magnet embedded portion into which the permanent magnet is embedded in a direction perpendicular to the radial direction of the rotor and an "L"-shaped air gap part integrally provided on both ends of the permanent magnet embedded part, and the substantially straight part is formed in the outer peripheral face of the rotor corresponding to the portion of the "L"-shaped air gap part.

According to the permanent magnet embedded motor having such a constitution, adjacent rotor plates constituting the rotor are capable of being disposed without a gap space therebetween in a steel plate which is the material for the rotor and thus the waste of the material is reduced when the steel plate is punched out by a press machine or the like. Furthermore, the length of the "L"-shaped air gap part in the peripheral direction of the rotor is set to be appropriate, and thus the cogging torque and the counter-electromotive force distortion factor are reduced to smooth the rotation of the motor.

In order to achieve the above advantage, according to the present invention, there is provided a permanent magnet embedded motor including a rotor which is formed by laminating a plurality of rotor plates, a stator which is provided with an iron core having a plurality of slots to which a coil is wound and is arranged to face the rotor via a gap, and a rotor plate fixing member which is made of non-magnetic material to fix the plurality of rotor plates laminated together. The rotor includes a plurality of slits, a plurality of permanent magnets embedded into the slits, a plurality of hole parts each of which is formed in the vicinity on extending lines of the two adjacent slits in its longitudinal direction and formed so as to penetrate the rotor in its axial direction. Furthermore, a configuration for one pole of the rotor is formed of a plurality of circular segments, the radius of one of the circular segments is to form an outer peripheral portion corresponding to a central portion for the permanent magnet to be embedded and the radius of another circular segments is to form an outer peripheral portion corresponding to end portions of the slit and the radiuses are different form each other.

According to the permanent magnet embedded motor having such a constitution, the occurrence of the iron loss (hysteresis loss and eddy current loss) is prevented and the cogging torque and the counter-electromotive force distortion factor are reduced to smooth the rotation of the motor. Also, the rotation efficiency of the motor can be enhanced and the vibration and noise due to the rotation of the motor can be reduced.

In accordance with an embodiment of the present invention, the radius of the outer peripheral portion corresponding to the central portion for the permanent magnet to be embedded is smaller than that of the outer peripheral portion corresponding to the end portions of the slit. According to the permanent magnet embedded motor having such a constitution, the cogging torque and the counter-electromotive force distortion factor are reduced to smooth the rotation of the motor.

In accordance with an embodiment of the present invention, the rotor plate fixing member may be formed with a pin or a screw. According to the constitution described above, the occurrence of the hysteresis loss is prevented and the rotation efficiency is enhanced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1 is a cross-sectional view showing the rotor of a permanent magnet-embedded motor in accordance with an embodiment of the present invention;

FIG. 2 is an enlarged cross-sectional view showing an important portion of the rotor shown in FIG. 1;

FIG. 3(a) is a graph which shows the variation of a counter-electromotive force distortion factor when the ratio ($\theta 2/\theta 1$) of the angle $\theta 2$ of an "L"-shaped air gap part with respect to the angle $\theta 1$ for one permanent magnet pole of the rotor of the permanent magnet-embedded motor is varied in accordance with the embodiment of the present invention. FIG. 3(b) is a graph which shows the variation of a counter-electromotive force distortion factor when the ratio (R−R1)/R of the outer peripheral circular segment radius R1 with respect to the radius R of the circumscribed circle of the rotor is varied;

FIG. 4(a) is a graph which shows the variation of a cogging torque when the ratio ($\theta 2/\theta 1$) of the angle $\theta 2$ of an "L"-shaped air gap part with respect to the angle $\theta 1$ for one permanent magnet pole of the rotor of the permanent magnet-embedded motor is varied in accordance with the embodiment of the present invention. FIG. 4(b) is a graph which shows the variation of a cogging torque when the ratio (R−R1)/R of the outer peripheral circular segment radius R1 with respect to the radius R of the circumscribed circle of the rotor is varied;

FIGS. 5(a), 5(b) and 5(c) are graphs which respectively show the output waveform of the counter-electromotive force in the permanent magnet-embedded motor. FIG. 5(a) is a graph showing the conventional example, and FIGS. 5(b) and 5(c) are graphs which respectively show different embodiments of the present invention;

FIGS. 6(a), 6(b) and 6(c) are graphs which respectively show the variation of the cogging torque in the permanent magnet-embedded motor. FIG. 6(a) is a graph showing the conventional example, and FIGS. 6(b) and 6(c) are graphs which respectively show different embodiments of the present invention;

FIGS. 7(a) and 7(b) are cross-sectional views which respectively show an important portion of the rotor of a permanent magnet-embedded motor in accordance with another embodiment of the present invention;

FIG. 8 is a cross-sectional view which shows an important portion of the rotor of a permanent magnet-embedded motor in accordance with another embodiment of the present invention;

FIG. 9 is a plan view showing a steel plate in which rotor plates are illustrated to produce the rotor plates by using the steel plate in accordance with an embodiment of the present invention;

FIG. 10 is a plan view showing a steel plate in which rotor plates are illustrated in accordance with another embodiment of the present invention;

FIGS. 11(a), 11(b) and 11(c) are enlarged plan views respectively showing different embodiments of the configuration in the vicinity of the "L"-shaped air gap part of the rotor;

FIG. 12 is a plan view which shows a rotor plate of the rotor of a permanent magnet-embedded motor in accordance with another embodiment of the present invention;

FIG. 13(a) is a side view showing the rotor of the permanent magnet-embedded motor using the rotor plate shown in FIG. 12. FIG. 13(b) is a front view showing the rotor shown in FIG. 13(a);

FIGS. 14(a) through 14(f) are plan views which respectively show different types of a hole part provided in the rotor of a permanent magnet-embedded motor in accordance with an embodiment of the present invention; and FIG. 15 is an enlarged view showing an outer peripheral form of the rotor of a permanent magnet-embedded motor in accordance with an embodiment of the present invention.

DETAILED DESCRIPTION OF THE PREFERRED EMBODIMENTS

Permanent magnet-embedded motors in accordance with embodiments of the present invention will be described below with reference to the accompanying drawings.

FIG. 1 shows a basic constitution of a rotor which is used in a permanent magnet-embedded motor in accordance with an embodiment of the present invention. A rotor 11 of the permanent magnet-embedded motor is constituted by laminating a plurality of rotor plates which are punched out from a thin steel plate by a press machine or the like. An outer peripheral configuration of the rotor plate is formed of a plurality of circular segments whose curvature is different from that of the circumscribed circle of the rotor plate. Concretely, as shown in FIG. 2, the outer peripheral face of the rotor plate is constituted by connecting four circular segments with the radius R1 which is shorter than the radius R of the circumscribed circle of the rotor plate. At least one pair (two pairs in the embodiment shown in FIGS. 1 and 2) of slits 20 for embedding the permanent magnet 12 is formed in the inside of the rotor 11. The respective slits 20 are formed in a direction so as to be orthogonal to the radial direction of the rotor 11. The slit 20 includes a permanent magnet embedded part 21 into which a permanent magnet is embedded and "L"-shaped air gap parts 22 which are provided at the both ends of the permanent magnet embedded part 21. The respective slits 20 are formed so as to correspond to the four circular segments and therefore, the permanent magnet embedded parts 21 are respectively formed corresponding to the circular segments.

The "L"-shaped air gap part 22 is formed at both end portions of the permanent magnet embedded part 21 of the slit 20 and constituted of a radial air gap part 22a extending in a radial direction of the rotor 11 and a peripheral air gap part 22b extending in a peripheral direction of the rotor 11.

The permanent magnet 12 formed in a plate shape is embedded into the permanent magnet embedded part 21. The adjacent permanent magnets 12 are disposed so as to have different magnetic poles each other and thus the magnetic fluxes generated from the respective permanent magnets may be short-circuited between the adjacent magnetic poles in an adjacent part 23 of the adjacent permanent magnets 12, which causes the magnetic field between the stator and the rotor 11 to be weaker. In order to prevent the short circuit of the magnetic flux, the radial air gap part 22a of the "L"-shaped air gap part 22 is formed so as to extend in the radial direction of the rotor 11 from the end part of the permanent magnet embedded part 21 to the vicinity of the outer peripheral face of the rotor 11 for preventing the short circuit of the magnetic flux.

FIG. 2 shows an enlarged view of a part of the rotor 11, which describes the constitution of the "L"-shaped air gap part 22 in detail. In FIG. 2, the outer peripheral part 11a of the rotor 11 is formed by a circular segment of a curvature having the radius R1 which is smaller than the radius R of the circumscribed circle of the rotor 11. The center of the circle of the curvature with the radius R1 is located at the position which is apart with the distance "a1" on the outer peripheral side from the center 111c of the circumscribed circle of the rotor 11 and is on the radial axis passing through the center position of the permanent magnet 12 in the peripheral direction. The respective centers of the circular segments with the radius R1 are formed on the radial axes which divide the circumscribed circle of the rotor 11 into four equal parts. In other words, the outer peripheral face of the rotor 11 is formed by the combination of four circular segments, i.e., the four peripheral parts 11a. FIG. 2 shows the upper half portion of the rotor 11.

An angle $\theta1$ defined between two straight lines which are respectively formed by connecting the terminating end of the circular segment, i.e., the outer peripheral part 11a and the center 11c of the circumscribed circle of the rotor 11 constitutes one pole of the rotor 11.

An angle $\theta2$ which is the angle of the "L"-shaped air gap part 22 is defined as an angle between the terminating end of the circular segment, i.e., the outer peripheral part 11a and the front end in the peripheral direction of the "L"-shaped air gap part 22 formed in the rotor.

The L-shaped air gap part 22 provided in the rotor 11 is preferably constituted in such a manner that the radiuses R, R1 and the angles $\theta1$, $\theta2$ satisfy the following the conditional expression; $0.1 \leq \theta2/\theta1 \leq 0.3$ and the conditional expression; $0.1 \leq (R-R1)/R \leq 0.3$ in order to obtain effects according to the present invention. Especially, the above-mentioned $\theta2/\theta1$ is preferably set to be $0.15 \leq \theta2/\theta1 \leq 0.25$, and more preferably set to be roughly 0.2. In addition, the above-mentioned $(R-R1)/R$ is preferably set to be $0.15 \leq (R-R1)/R \leq 0.25$, and more preferably set to be roughly 0.2.

Next, the reasons of the above-mentioned conditional expressions are described below with reference to FIGS. 3 and 4.

FIGS. 3(a) and 3(b) are graphs which respectively show the counter-electromotive force distortion factor when the following factors of the rotor 11 varies in accordance with an embodiment of the present invention. In FIG. 3(a), the ratio of the angle $\theta2$ with respect to the angle $\theta1$ in the rotor 11 is varied. The value of $\theta2/\theta1$ is illustrated on the horizontal axis and the vertical axis shows the counter-electromotive force distortion factor. As shown in FIG. 3(a), the counter-electromotive force distortion factor becomes the minimum when the value of $\theta2/\theta1$ is roughly 0.2. In FIG. 3(b), the ratio $(R-R1)/R$ of the radius R and the radius R1 in the rotor 11 is varied. The value of $(R-R1)/R$ is illustrated on the horizontal axis and the vertical axis shows the counter-electromotive force distortion factor. As shown in FIG. 3(b), the counter-electromotive force distortion factor becomes the minimum when the value $(R-R1)/R$ is roughly 0.2.

As shown in FIG. 3(a), when the ratio of $\theta2/\theta1$ is smaller than 0.1 or larger than 0.3, the counter-electromotive force distortion factor becomes larger and preferable results are not obtained for practical use. Therefore, the ratio of $\theta2/\theta1$ is preferably set to be in the range between 0.1 and 0.3. Especially, as shown in FIG. 3(a), the ratio of $\theta2/\theta1$ is more preferably set to be $0.15 \leq \theta2/\theta1 \leq 0.25$, and most preferably set to be roughly 0.2. Besides, as shown in FIG. 3(b), when the ratio of $(R-R1)/R$ is smaller than 0.1 or larger than 0.3, the counter-electromotive force distortion factor becomes larger and preferable results are not obtained for practical use. Therefore, the ratio of $(R-R1)/R$ is preferably set to be in the range between 0.1 and 0.3. Especially, as shown in FIG. 3(b), the ratio of $(R-R1)/R$ is more preferably set to be $0.15 \leq (R-R1)/R \leq 0.25$, and most preferably set to be roughly 0.2.

FIGS. 4(a) and 4(b) are graphs which respectively show the cogging torque when the following factors of the rotor 11 varies in accordance with an embodiment of the present invention. In FIG. 4(a), the ratio $\theta2/\theta1$ of the angle $\theta1$ and the angle $\theta2$ in the rotor 11 is varied. The value of $\theta2/\theta1$ is illustrated on the horizontal axis and the vertical axis shows the cogging torque. As shown in FIG. 4(a), the cogging torque becomes the minimum when the value of $\theta2/\theta1$ is roughly 0.2. In FIG. 4(b), the ratio $(R-R1)/R$ of radius R and radius R1 in the rotor 11 is varied. The value of $(R-R1)/R$ is illustrated on the horizontal axis and the vertical axis shows the cogging torque. As shown in FIG. 4(b), the cogging torque becomes the minimum when the value $(R-R1)/R$ is roughly 0.2.

As shown in FIG. 4(a), when the ratio of $\theta2/\theta1$ is smaller than 0.1 or larger than 0.3, the cogging torque becomes larger. Also, when the ratio of $(R-R1)/R$ is smaller than 0.1 or larger than 0.3, the cogging torque becomes larger. Therefore, the ratio of $\theta2/\theta1$ is preferably set to be in the range between 0.1 and 0.3 and the ratio of $(R-R1)/R$ is preferably set to be in the range between 0.1 and 0.3. In addition, similarly as shown in FIG. 4(a), the ratio $\theta2/\theta1$ is more preferably set to be $0.15 \leq \theta2/\theta1 \leq 0.25$, and most preferably set to be roughly 0.2. Also, similarly as shown in FIG. 4(b), the ratio $(R-R1)/R$ is more preferably set to be $0.15 \leq (R-R1)/R \leq 0.25$, and most preferably set to be roughly 0.2.

FIGS. 5(a), 5(b) and 5(c) are graphs which respectively show the output waveform of the counter-electromotive force in the permanent magnet-embedded motor. The horizontal axis in FIGS. 5(a), 5(b) and 5(c) indicates the rotation angle of the rotor and the vertical axis indicates the magnitude of the counter-electromotive force. FIG. 5(a) is a graph showing the conventional type of a motor in which the outer peripheral face of the rotor 11 is constituted of a single circle without using a plurality of the circular segments and without providing with the "L"-shaped air gap parts 22. FIG. 5(b) is a graph which shows the output waveform of the counter-electromotive force in accordance with an embodiment of the present invention in which the "L"-shaped air gap part is provided and the outer peripheral face of the rotor 11 is constituted of a single circle without using a plurality of the circular segments. Concretely, the angles $\theta1$ and $\theta2$ shown in FIG. 2 are set to be $\theta2/\theta1=0.2$ and the ratio of the $(R-R1)/R$ of the radiuses R and R1 is set to be less than 0.1. In FIG. 5(b), the variation of the curve becomes more smooth compared with the conventional motor shown in FIG. 5(a) and the counter-electromotive force distortion factor is also improved.

FIG. 5(c) is a graph which shows the output waveform of the counter-electromotive force in accordance with an embodiment of the present invention in which the outer peripheral face of the rotor 11 is formed by the combination of four circular segments of the curvature having the radius R1, i.e., the four peripheral parts 11a as well as the "L"-shaped air gap parts 22. Concretely, the angles $\theta1$ and $\theta2$ shown in FIG. 2 are set to be $\theta2/\theta1=0.2$ and the ratio of the $(R-R1)/R$ of the radiuses R and R1 is also set to be 0.2.

The counter-electromotive force is always generated in a motor and the generated quantity is an important factor which influences the characteristics of the motor. In FIGS. 5(a), 5(b) and 5(c), the smoother the variation of the curves, the smoother and the more efficient is the rotation of the rotor 11. Therefore, the variation of the curve shown in FIG.

5(*c*) is the smoothest and thus the counter-electromotive force distortion factor is the lowest.

FIGS. 6(*a*), 6(*b*) and 6(*c*) are graphs which respectively show the output waveform of the cogging torque in the permanent magnet-embedded motor. The horizontal axis in FIGS. 6(*a*), 6(*b*) and 6(*c*) indicates the rotation angle of the rotor and the vertical axis indicates the magnitude of the cogging torque. FIG. 6(*a*) is a graph showing the conventional type of the motor in which the outer peripheral face of the rotor is constituted of a single circle without using four circular segments and without providing with the "L"-shaped air gap parts 22. FIG. 6(*b*) is a graph which shows the output waveform of the cogging torque in accordance with an embodiment of the present invention in which the "L"-shaped air gap part is provided and the outer peripheral face of the rotor is constituted of a single circle without using a plurality of the circular segments. Concretely, the angles $\theta 1$ and $\theta 2$ shown in FIG. 2 are set to be $\theta 2/\theta 1=0.2$ and the ratio of the $(R-R1)/R$ of the radiuses R and R1 is set to be less than 0.1.

FIG. 6(*c*) is a graph which shows the output waveform of the cogging torque in accordance with an embodiment of the present invention in which the outer peripheral face of the rotor 11 is formed by the combination of four circular segments of the curvature having the radius R1, i.e., the four peripheral parts 11*a* as well as the "L"-shaped air gap parts 22. Concretely, the angles $\theta 1$ and $\theta 2$ shown in FIG. 2 are set to be $\theta 2/\theta 1=0.2$ and the ratio of the $(R-R1)/R$ of the radiuses R and R1 is also set to be 0.2.

The cogging torque is always generated in a motor and the generated quantity is an important factor which influences the characteristics of the motor. In FIGS. 6(*a*), 6(*b*) and 6(*c*), the smaller and smoother the variation of the curves, that is, the smaller the value of the cogging torque, the smoother and the more efficient is the rotation of the rotor 11. Therefore, in FIG. 6(*b*), the variation of the curve becomes smoother compared with the conventional motor shown in FIG. 6(*a*) and the cogging torque is also improved. Furthermore, the variation of the curve shown in FIG. 6(*c*) is the smoothest and thus the cogging torque is the lowest.

FIGS. 7(*a*) and 7(*b*) respectively show a rotor 11 in accordance with another embodiment of the present invention. In FIG. 7(*a*), the outer peripheral part 1*a* of the rotor 11 is formed by the combination of three types of circular segments of curvatures having the radiuses R1, R2 and R3 which are respectively smaller than the radius R of the circumscribed circle of the rotor 11. The ranges of the radiuses R1, R2 and R3 in the outer peripheral part 11*a* of the rotor 11 are shown for the half of the angle $\theta 1$ of one pole and are illustrated on the outer side of the outer peripheral part 11*a* of the rotor 11 in the drawing. In the embodiment of the present invention, the radiuses R1, R2 and R3 are set to be R>R1>R2>R3.

FIG. 7(*b*) shows another embodiment of the outer peripheral part 11*a* of the rotor 11 constituted of two types of circular segments of curvatures having the radiuses R1 and R2. In FIG. 7(*b*), when the distances between the centers for the respective radiuses R1, R2 and the center of the circumscribed circle having the radius R of the rotor 11 are respectively set to be "a1" and "a2", the following relationship is satisfied: $a1 \times 0.8 \leq a2 \leq a1 \times 1.2$.

FIG. 8 shows another embodiment of the rotor used in a permanent magnet-embedded motor of the present invention. The rotor 11 of the permanent magnet-embedded motor is constituted of a plurality of rotor plates to be laminated, each of which is punched out from a thin steel plate by a press machine or the like. The outer peripheral face of the rotor 11 is constituted of a plurality of circular segments 15 and straight parts 16. Similarly as described in the embodiments shown in FIG. 2, at least one pair (two pairs in the embodiment shown in FIG. 8) of slits 20 for embedding the permanent magnet 12 is formed in the inside of the rotor 11. The respective slits 20 are formed in a direction so as to be orthogonal to the radial direction of the rotor 11. The slit 20 includes a permanent magnet embedded part 21 into which a permanent magnet is embedded and "L"-shaped air gap parts 22 which are provided at the both ends of the permanent magnet embedded part 21. The "L"-shaped air gap part 22 is formed at both end portions of the permanent magnet embedded part 21 of the slit 20 and constituted of a radial air gap part 22*a* extending in the radial direction of the rotor 11 and a peripheral air gap part 22*b* extending in the peripheral direction of the rotor 11.

The region of one pole of the rotor 11 including one permanent magnet 20 is set to be the angle $\theta 1$. The angle $\theta 2$ is defined as the angle between the boundary line to the adjacent pole of the rotor 11 (end portion of the region of one pole of the rotor 11) and the front end of the peripheral air gap part 22*b* in the peripheral direction of the "L"-shaped air gap part 22 formed in the rotor. The L-shaped air gap part 22 provided in the rotor 11 is preferably constituted in such a manner that the angles $\theta 1$ and $\theta 2$ satisfy the following the conditional expression; $0.1 \leq \theta 2/\theta 1 \leq 0.3$.

FIG. 9 shows an arrangement of rotor plates 31 in a steel plate 30 which is material for forming the rotor 11 in FIG. 8. The rotor plates 31 are arranged in the steel plate 30 without a gap space therebetween so as to be produced efficiently. In the embodiment shown in FIG. 8, the outer peripheral face of the rotor 11 is constituted of the circular segments 15 and the straight parts 16. Therefore, the straight parts 16 of the rotor 11 can be disposed in the steel plate 30 without a gap space so as to form a straight part 32 as shown in FIG. 9. Accordingly, adjacent rotor plates 31 are capable of being disposed in the steel plate 30 without a gap space and thus the waste of material is reduced when the steel plate 30 is punched out by a press machine.

FIG. 10 shows an arrangement of another rotor plates in a steel plate 30 which is the material for forming the rotor 11. The outer peripheral configuration of the rotor plate is not limited to a rectangular round shape constituting the rotor with four-poles as shown in FIG. 9 but may be formed in a hexagonal round shape constituting the rotor with six poles as shown in FIG. 10. Alternatively, the outer peripheral configuration of the rotor plate may be formed in an octagonal round shape or in a round shape having ten angles.

FIGS. 11(*a*), 11(*b*) and 11(*c*) show another embodiments of the straight part 16 shown in FIG. 8 or the straight part 32 shown in FIG. 9, which is provided in the outer peripheral portion of the rotor plate 31. The straight part 32 may be, as shown in FIG. 11(*a*), provided with a triangular recessed part 33 at the position between the "L"-shaped air gap parts 22. Alternatively, a circular recessed part 34 may be formed in the straight part 32 as shown in FIG. 11(*b*) or a rectangular recessed part 35 may be formed in the straight part 32 as shown in FIG. 11(*c*). Moreover, as for the recessed part, a polygonal recessed part may be used and a plurality of recessed parts may be provided in the straight part 32. The straight part 32 may be formed to be substantially straight part.

Next, FIG. 12 is a plan view which shows the rotor plate of the rotor of a permanent magnet-embedded motor in accordance with another embodiment of the present invention. The rotor 11 of the permanent magnet-embedded motor is constituted of a plurality of rotor plates to be laminated, each of which is punched out from a thin steel plate by a press machine or the like similarly to the above-mentioned embodiment of the present invention.

The outer peripheral configuration of the rotor 11 is, as shown in FIG. 15, formed by four circular segments of a curvature having the radius R1 which is smaller than the radius R of the circumscribed circle of the rotor 11. The permanent magnet 12 is embedded into the slit 20. The radius R1 for forming of the outer peripheral surface of the respective circular segments is set to be smaller (R>R1) than the radius R of the circumscribed circle of the rotor 11.

In FIG. 12, at least one pair (two pairs in the embodiment shown in FIG. 12) of slits 20 for embedding the permanent magnet 12 is formed in the inside of the rotor 11. The respective slits 20 are formed in a direction so as to be orthogonal to the radial direction of the rotor 11. Hole parts 13 are formed in a direction penetrating through the rotor plate on outer sides of both ends of the slit 20.

The hole part 13 is formed in the vicinity of the extending line on the slit 20 in its longitudinal direction between the slit 20 and the outer peripheral face of the rotor.

Next, the constitution of the rotor 11 is described below with reference to FIG. 13(*a*). The rotor 11 is constituted of a plurality of rotor plates to be laminated, each of which is punched out from a steel plate 30 by a press machine or the like. FIG. 13(*a*) is a side view of the rotor viewed from the direction perpendicular to a rotor shaft (not shown). The rotor 11 is constituted in such a manner that the permanent magnets 12 are respectively embedded into the slits 20, two side plates 14 are disposed on either side of the laminated rotor plates, and then the laminated rotor plates are fixed by fixing members 15 respectively penetrating through the hole part 13. As shown in FIG. 13(*a*), the entire rotor is fixed such that the fixing members 15 penetrating through the hole parts 13 push the side plates 14 and the laminated rotor plates from both sides.

A screw 15*a* and a nut 15*b* as the fixed member 15 used for fixing the side plates 14 are respectively made of non-magnetic material. FIG. 13(*b*) is a side view of the entire rotor shown in FIG. 13(*a*). In FIG. 13(*b*), the screws 15*a* for fixing the side plates 14 are shown. Alternatively, the fixing member is not limited to a screw and a nut. Other nonmagnetic materials may be used as the fixing member.

FIGS. 14(*a*) through 14(*f*) show another embodiments of the hole part 13 formed in the rotor 11. FIG. 14(*a*) shows an example in which the hole part 13 is formed in a circular shape. Alternatively, the hole part 13 may be formed in a rectangular shape as shown in FIG. 14(*b*) and, as shown in FIG. 14(*c*), in a polygonal shape such as a hexagonal shape.

Further, as shown in FIGS. 14(*d*), 14(*e*) and 14(*f*), air gap parts 13*d* may be formed on both sides of the hole part 13 in the rotating direction of the rotor. The cogging torque and the counter-electromotive force distortion factor is reduced by the air gap part 13*d*. The air gap part 13*d* may be formed, as shown in FIG. 14(*f*), only on one side of the hole part 13. In this case, the direction of rotation is limited to only one.

In the embodiment described above, the permanent magnet embedded motor includes the rotor which is provided with a plurality of slits and a plurality of permanent magnets embedded into the slits and the stator which is provided with the iron core having a plurality of slots to which a coil is wound and is arranged to face the rotor via a gap. The slit includes the permanent magnet embedded part into which the permanent magnet is embedded in a direction perpendicular to the radial direction of the rotor and the "L"-shaped air gap parts integrally provided on both ends of the permanent magnet embedded part. Furthermore, the angle "θ1" for one pole of the rotor and the angle "θ2" of the "L"-shaped air gap part are set to be $0.1 \leq \theta2/\theta1 \leq 0.3$.

According to the permanent magnet embedded motor described above, the magnetic flux distribution near the position where the polarity of the permanent magnet used in the rotor is inverted is capable of forming in a smooth shape and thus the cogging torque and the counter-electromotive force distortion factor are reduced. Accordingly, the torque ripple decreases and the vibration and noise at the motor rotation are reduced.

Also, in the embodiment described above, the permanent magnet embedded motor includes the rotor which is provided with a plurality of slits and a plurality of permanent magnets embedded into the slits, the stator which is provided with an iron core having a plurality of slots to which a coil is wound and is arranged to face the rotor via a gap, and the substantial straight part which forms a part of an outer peripheral face of the rotor. Therefore, adjacent rotor plates constituting the rotor are capable of being disposed in a steel plate which is the material for the rotor without a gap space and thus the waste of the material is reduced when the steel plate is punched out by a press machine or the like.

Also, in the embodiment described above, the permanent magnet embedded motor including the rotor which is formed by laminating a plurality of rotor plates, the stator which is provided with an iron core having a plurality of slots to which a coil is wound and is arranged to face the rotor via a gap, and the rotor plate fixing member which is made of non-magnetic material to fix the plurality of rotor plates to be laminated together. The rotor includes a plurality of slits, a plurality of permanent magnets embedded into the slits, a plurality of hole parts each of which is formed in a vicinity on extending lines of the two adjacent slits in its longitudinal direction and formed so as to penetrate the rotor in its axial direction. Furthermore, a configuration for one pole of the rotor is formed of a plurality of circular segments, the radius of one of the circular segments is to form an outer peripheral portion corresponding to a central portion for the permanent magnet to be embedded and the radius of another circular segments is to form an outer peripheral portion corresponding to end portions of the slit and the radiuses are different form each other. Therefore, the cogging torque and the counter-electromotive force distortion factor are reduced to smooth the rotation of the motor. Also, the rotation efficiency of the motor can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A permanent magnet embedded motor comprising:
  a rotor which is provided with a plurality of slits and a plurality of permanent magnets embedded into the slits, the slit comprising:
  a permanent magnet embedded part into which the permanent magnet is embedded in a direction perpendicular to the radial direction of the rotor; and an "L"-shaped air gap part integrally provided on both ends of the permanent magnet embedded part; and a stator which is provided with an iron core having a plurality of slots to which a coil is wound and is arranged to face the rotor via a gap, wherein an angle "θ1" for one pole of the rotor and an angle "θ2" of the "L"-shaped air gap part are set to be $0.1 \leq \theta2/\theta1 \leq 0.3$.

2. The permanent magnet embedded motor according to claim 1, wherein the angle "θ1" and the angle "θ2" are set to be $0.15 \leq \theta2/\theta1 = 0.25$.

3. The permanent magnet embedded motor according to claim 1, wherein a radius "R" of a circumscribed circle of the rotor and a radius "R1" for forming an outer peripheral face of the rotor at a portion of the "L"-shaped air gap part are set to be $0.1 = (R-R1)R \leq 0.3$.

4. The permanent magnet embedded motor according to claim 3, wherein the radius "R" and the radius "R1" are set to be $0.15 \leq (R-R1)/R \leq 0.25$.

5. The permanent magnet embedded motor according to claim 1, wherein a radius "R1" for forming an outer peripheral face of the rotor for an angle "θ1" for one pole of the rotor and a radius "R" of a circumscribed circle of the rotor are set to be $0.1 \leq (R-R1)/R \leq 0.3$.

6. The permanent magnet embedded motor according to claim 5, wherein the radius "R1" and the radius "R" are set to be $0.15 \leq (R-R1)/R \leq 0.25$.

7. A permanent magnet embedded motor comprising:

a rotor which is provided with a plurality of slits and a plurality of permanent magnets embedded into the slits;

a stator which is provided with an iron core having a plurality of slots to which a coil is wound and is arranged to face the rotor via a gap; and a substantially straight part which forms a part of an outer peripheral face of the rotor, wherein the slit comprises a permanent magnet embedded part into which the permanent magnet is embedded in a direction perpendicular to the radial direction of the rotor and an "L"-shaped air gap part integrally provided on both ends of the permanent magnet embedded portion, and wherein the substantially straight part is formed in an outer peripheral face of the rotor corresponding to a portion of the "L"-shaped air gap part, wherein an angle "θ1" for one pole of the rotor and an angle "θ2" of the "L"-shaped air gap part are set to be $0.1 \leq \theta2/\theta1 \leq 0.3$.

* * * * *